Feb. 5, 1952 E. G. STAUDE 2,584,638
UNLOADING VALVE MECHANISM FOR FLUID PRESSURE PUMPS
Filed Feb. 21, 1946 4 Sheets-Sheet 1

INVENTOR
Edwin G. Staude
BY
Arthur Wright
ATTORNEY

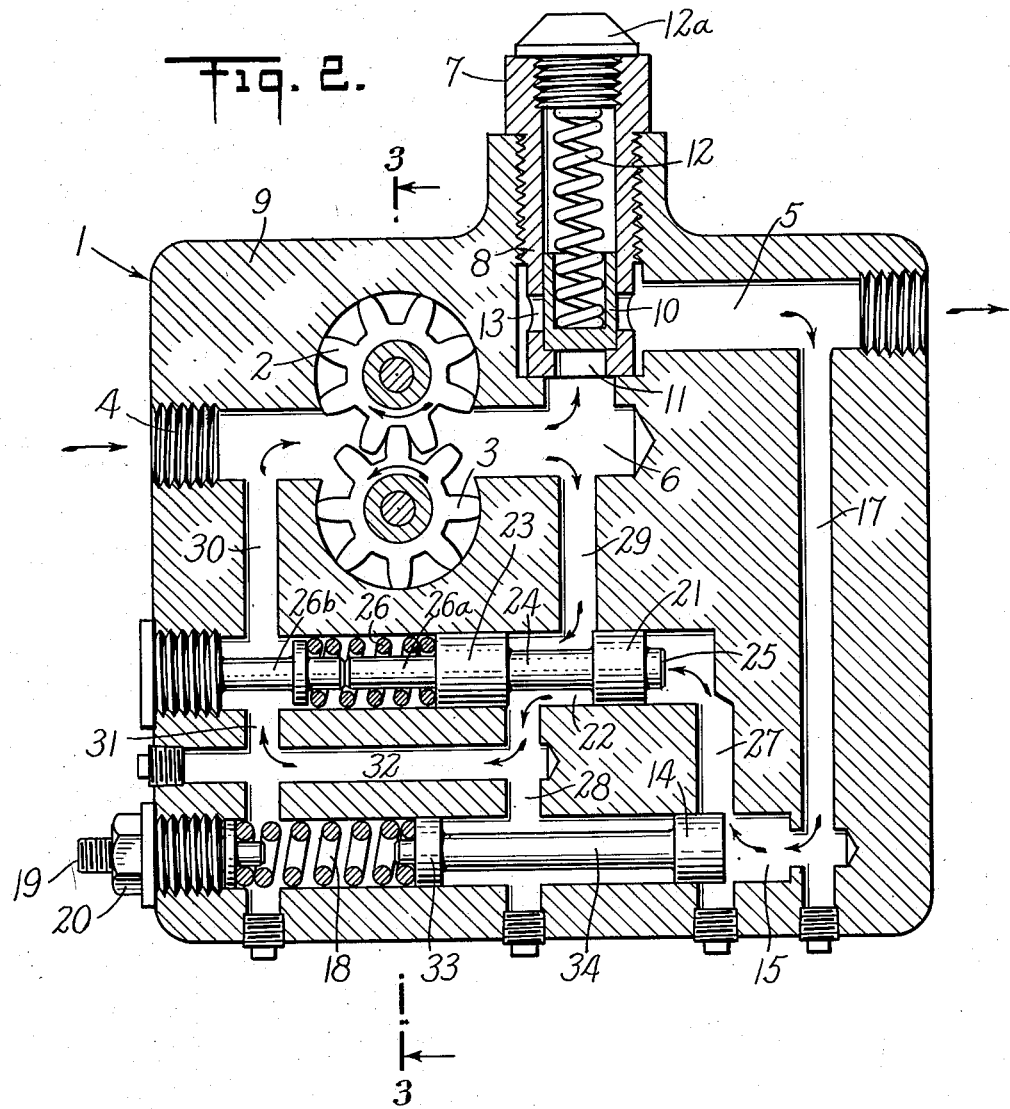

Feb. 5, 1952            E. G. STAUDE            2,584,638
UNLOADING VALVE MECHANISM FOR FLUID PRESSURE PUMPS
Filed Feb. 21, 1946            4 Sheets-Sheet 3
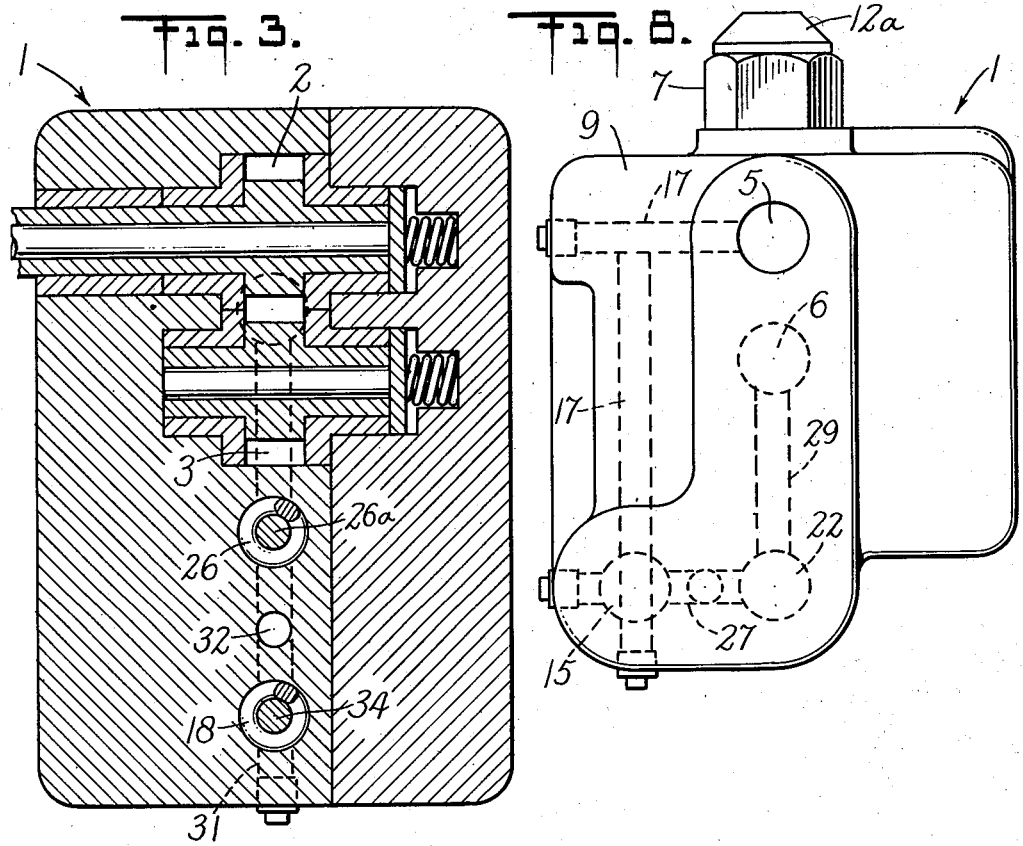
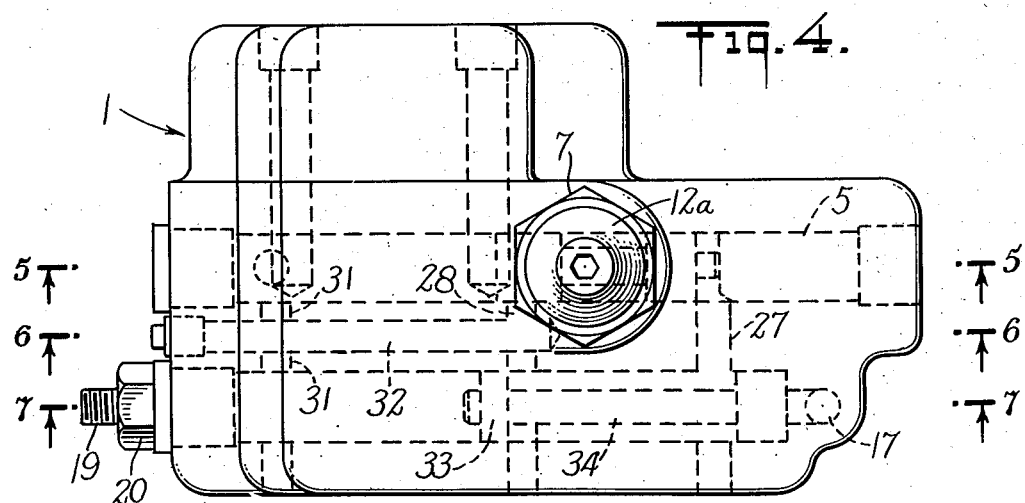
INVENTOR
Edwin G. Staude
BY
Arthur Wright
ATTORNEY Feb. 5, 1952　　　　　E. G. STAUDE　　　　2,584,638
UNLOADING VALVE MECHANISM FOR FLUID PRESSURE PUMPS
Filed Feb. 21, 1946　　　　　　　　　　4 Sheets-Sheet 4
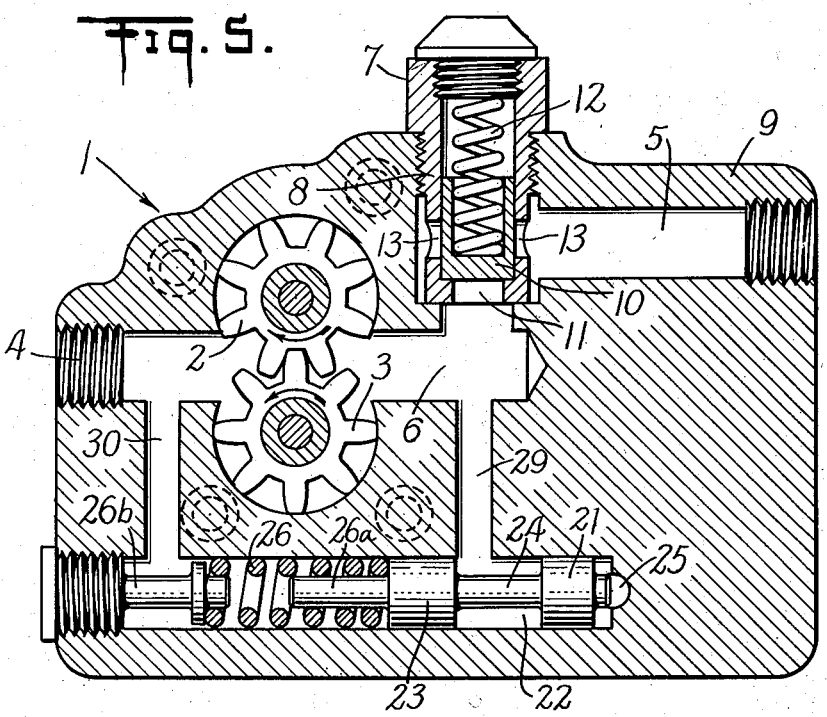
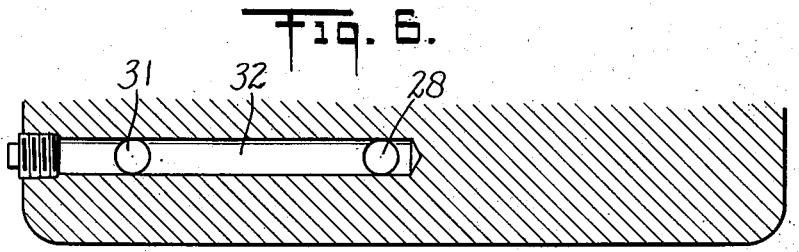
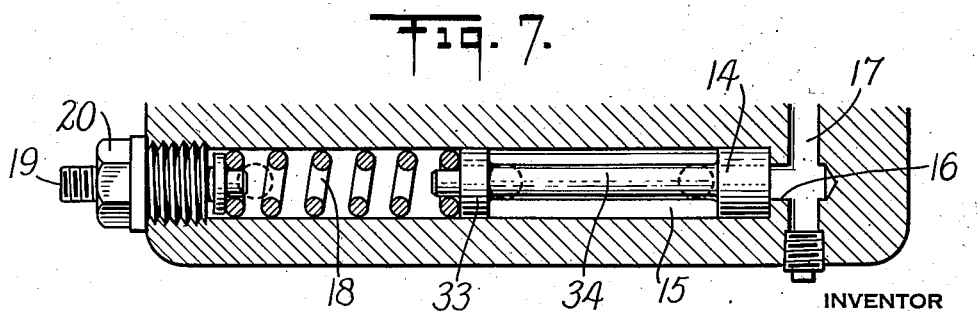
INVENTOR
Edwin G. Staude
BY
Arthur Wright
ATTORNEY Patented Feb. 5, 1952

2,584,638

UNITED STATES PATENT OFFICE 2,584,638

UNLOADING VALVE MECHANISM FOR FLUID PRESSURE PUMPS

Edwin G. Staude, Minneapolis, Minn.

Application February 21, 1946, Serial No. 649,285

12 Claims. (Cl. 137—153)

My invention relates particularly to mechanisms for unloading valves of fluid pressure pumps.

One of the objects of my invention is to provide a valve mechanism which can be used effectively in connection with the unloading of fluid pressure pumps. Another object is to provide means for supplying a pressure fluid to an accumulator so that when the maximum desired pressure in the accumulator is obtained the pressure will be relieved on the discharge side of the pump. Another object is to open a free circuit for the pump until the demand on the accumulator has reduced the pressure sufficiently to require further pressure fluid to be supplied from the pump. Another object is to provide a valve mechanism which is simple in construction and sufficiently compact to be incorporated into the pump structure. Again, a further object is to provide a mechanism of the piston type in which a slow moving valve is arranged to actuate a fast moving valve. Another object is to provide a valve mechanism having a rapid travel to open or close the circuit above referred to, and to provide an inexpensive mechanism for this purpose which is arranged to operate substantially without sudden shock or noise. More particularly, one of the objects is to provide a valve comprising a pair of piston plungers located side by side so that one of the plungers controls the movement of the other.

While my invention is capable of being carried out in many different ways, for the purpose of illustration I have shown only one form of my invention in the accompanying drawings, in which—

Fig. 2 is a similar diagrammatic vertical section of the same but shown in the position in which the piston plungers permit the free circulation of the fluid of the continuously operating pump;

Fig. 3 is a vertical cross section of the same taken on line 3—3 of Fig. 2;

Fig. 4 is a plan view of the pressure fluid pump to which my invention is applied;

Fig. 5 is a vertical section of the same taken on line 5—5 of Fig. 4;

Fig. 6 is a vertical section of the same taken on line 6—6 of Fig. 4;

Fig. 7 is a vertical section taken on line 7—7 of Fig. 4; and

Fig. 8 is an end view of the pump shown in Fig. 4.

Figure 1:
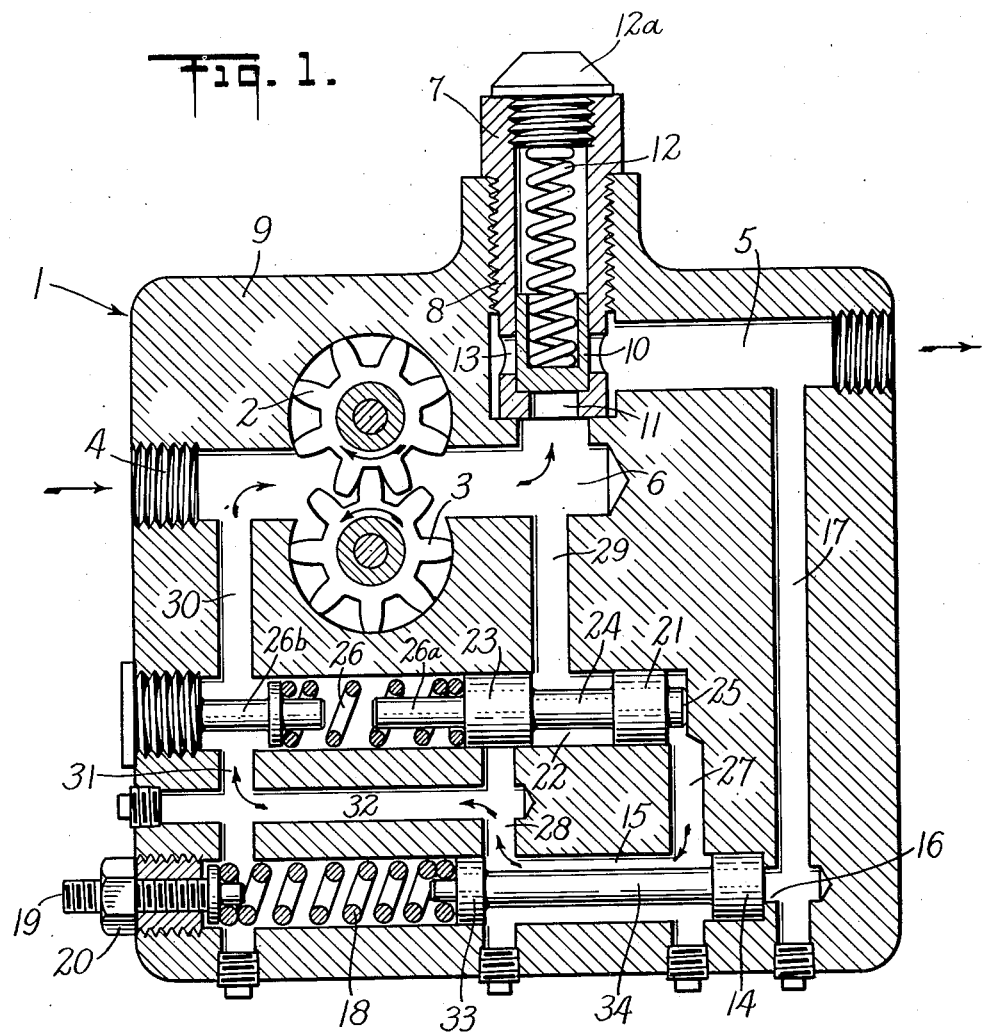
Fig. 1 is a diagrammatic vertical section of a pressure pump mechanism and unloading valve mechanism constructed in accordance with my invention, said mechanism containing two piston plungers within a circuit, including a pump shown in the position in which it is delivering the pressure fluid to an accumulator.

Referring to the drawings, and particularly Fig. 1 thereof, I have provided a gear pump 1 having a pair of pump gears 2 and 3 revolving in the direction shown by the arrows in said figure, adapted to draw fluid into the same by means of a passageway 4 and expel the fluid from an outlet passageway 5 connected to any desired type of accumulator (not shown). Between the passageway 5 and a chamber 6, located on the discharge side of the pump, I have provided a check valve 7 comprising a sleeve 8 screw-threaded into a pump casing 9 in which the pump gears 2 and 3 are mounted, said sleeve having a piston 10 therein which is adapted to close an opening 11 in the lower portion of the sleeve and which is held in closed position by a helical spring 12 supported at its upper end by a screw-threaded centering plug 12a to the top of the sleeve 12. The said opening 11 is arranged to receive pressure fluid from the chamber 6 so that normally, when the pressure liquid is being delivered to the accumulator, the spring 12 will be compressed by the piston 10 so as to permit the pressure liquid to pass from the opening 11 through a series of openings 13 around the sleeve 7 and thence by the passageway 5 to the accumulator. This construction permits the flow from the chamber 6 to the accumulator but prevents a return of the pressure liquid therefrom to the chamber 6 in the event that the pump gears 2 and 3 are no longer supplying pressure fluid to the accumulator, due to the operation of my valve structure hereinafter described.

This valve structure comprises a piston plunger valve 14 operating in a passageway 15 and normally held against a restricted opening 16 connected by a passage 17 to the outlet passageway 5. The said piston plunger valve 14 is held against the restricted opening 16, so as to normally close the same, by means of a helical spring 18 which can be adjusted by a set screw 19 screw-threaded into the pump casing 9 and locked in place by means of a nut 20. Another piston plunger 21 is located above the piston plunger valve 14, which operates in a passage 22. Said piston plunger 21 has connected thereto another piston valve 23 by an intervening reduced portion 24. The said plunger 21 is normally held against a stop 25 at the end of the passage 22 by means of a helical spring 26 located around a guiding stem 26a on the plunger 23, at one end of the spring 26, while the other end of the spring 26 is carried upon a flanged rod 26b screw-threaded in the pump casing 9 and extending into one end of the passage 22. A passage 27 connects the passage 22, in which the piston plunger 21 operates, with the passage 15 and a passage 29 connects the chamber 6 with the passage 22. Furthermore, a passageway 30 connects the passage 4 with the left end of the passage 22 and a passage 31 connects the passage 22 with the passage 15 in which the spring 18 operates. Also, a horizontal passage 32 connects the passage 28 with the passage 31 and, in the passage 15 adjacent to the passage 28, there is provided a piston 33 connected by a reduced portion 34 to the piston plunger valve 14, operating against the spring 18.

In the operation of the unloading valve mechanism, when the piston plungers 14 and 21 are in the position as shown in Fig. 1, the continuous rotary motion of the pump gears 2 and 3, which may be driven by any suitable source of power, as for instance an automobile or other engine, builds up pressure in the chamber 6, so that the pressure liquid will flow down the passageway 29 and bear equally against the plunger 21 and the piston valve 23. Because the pistons 21 and 23 are equally balanced, there is no resultant pressure urging these two pistons to move against the force of the spring 26. Accordingly, the pressure liquid flows through the port 11, raises the piston 10 and flows out through the openings 13 into the passage 5 to which the accumulator is connected. At the same time the liquid will flow down the passageway 17 and will bear against the end of the piston plunger valve 14 through the opening 16. However, the tension of the spring 18 is set so that the piston plunger valve 14 will prevent the flow of the liquid into the passageway 27 until after a maximum desired pressure is built up in the accumulator, at which time the spring 18 will be compressed so that the piston plunger valve 14 will gradually assume the position shown in Fig. 2, thus permitting the liquid to flow into the passage 15 and thence upwardly into the passages 27 and 22. This moves the piston plunger 21 instantly into the position shown in Fig. 2, causing the piston 23 to compress the spring 26 and uncover the passage 28, thus allowing the liquid from the chamber 6 to flow down the passageway 29 into the passage 22 and through the passage 28 into the passage 32, then by the passage 31 and the passage 30 to the inlet passage 4. This operation of the piston plungers 14 and 21, as shown in Fig. 2, illustrates the accumulator supply flow being cut off and a free or open circuit being established between the inlet and outlet sides of the pump gears 2 and 3. This position of the movable parts will continue until the pressure in the accumulator has been reduced sufficiently so that the pressure liquid passing down the passage 17 and bearing against the piston plunger 14 will be overcome by the pressure of the spring 18 so as to gradually close off the passageway 27 until a maximum pressure is again accumulated in the accumulator. However, the closing off of the passageway 27 does not cause any movement of the piston plunger 21 inasmuch as the pressure liquid is trapped on both sides of the piston plunger 21. As soon, however, as a reduction in the accumulated pressure takes place the piston plunger valve 14 continues to move toward the right, starting to uncover the communication between the passage 27 and the passage 15 which immediately permits the liquid trapped in the passageways 22 and 27 to flow through the passage 15 into the passages 28, 22, 31 and 30 to the intake passage 4. When the pressure is removed on the right hand side of the piston plunger 21 the spring 26 instantly moves the piston valve 23 into the position shown in Fig. 1, thus closing the passageway 28 by the piston 23 and preventing the flow of the free liquid circuit down the passageway 29 so that the pressure is again established in the chamber 26 which, having no other outlet, flows up the passage 11, raises the piston 10 and flows through the opening 13 into the outlet passage 5.

It will be understood that my fast moving valve mechanism may be utilized wherever desired and in any desired manner in connection with pumps, etc., as for instance to decrease or unload the pressures at any desired point in connection with pump gears when pressure is not required or to secure inaction of the pressure liquid.

While I have described my invention above in detail I wish it to be understood that many changes may be made therein without departing from the spirit of the same.

I claim:

1. A fast moving cylindrical plunger valve for alternately closing and opening by the cylindrical valve surface a pressure fluid circuit, a delivery passageway for pressure fluid, a check valve between a discharge-receiving chamber in said circuit and said delivery passageway, a spring-pressed imperforate valve-operating plunger attached to the fast moving valve said valve-operating plunger being located in a chamber, a conduit connecting said valve operating plunger chamber to the delivery passageway, and a slow moving valve normally closing communication between said conduit and the delivery passageway and arranged to be moved by the pressure in said delivery passageway to open access from the delivery passageway to the valve-operating plunger chamber so as to open said circuit but to close access from the valve operating plunger chamber to said circuit when the fast moving valve is opening, said valve-operating plunger having a balanced portion normally in communication with the pressure fluid.

2. A spring-pressed fast moving cylindrical plunger valve for alternately closing and opening by the cylindrical valve surface a pressure fluid circuit, a delivery passageway for pressure fluid, a check valve between a discharge-receiving chamber in said circuit and said delivery passageway, a spring-pressed imperforate valve-operating plunger attached to the fast moving valve said valve-operating plunger being located in a chamber, a conduit connecting said valve-operating plunger chamber to the delivery passageway, and a spring-pressed slow moving valve normally closing communication between said conduit and the delivery passageway and arranged to be moved by the pressure in said delivery passageway to open access from the delivery passageway to the valve-operating plunger chamber so as to open said circuit but to close access from the valve operating plunger chamber to said circuit when the fast moving valve is opening, said valve-operating plunger having a balanced portion normally in communication with the pressure field.

3. A fast moving cylindrical plunger valve for alternately closing and opening by the cylindrical valve surface a pressure fluid circuit, a delivery passageway for pressure fluid, a check valve between a discharge-receiving chamber in said circuit and said delivery passageway, a spring-pressed imperforate valve-operating plunger attached to the fast moving valve said valve-operating plunger being located in a chamber, a conduit connecting said valve operating plunger chamber to the delivery passageway, and a slow moving valve normally closing communication between said conduit and the delivery passageway and arranged to be moved by the pressure in said delivery passageway to open access from the delivery passageway to the valve-operating plunger chamber so as to open said circuit but to close access from the valve operating plunger chamber to said circuit when the fast moving valve is opening, said valve-operating plunger having a balanced portion normally in communication with the pressure fluid, said fast and slow moving valves being connected to said circuit.

4. A spring-pressed fast moving cylindrical plunger valve for alternately closing and opening by the cylindrical valve surface a pressure fluid circuit, a delivery passageway for pressure fluid, a check valve between a discharge-receiving chamber in said circuit and said delivery passageway, a spring-pressed imperforate valve-operating plunger attached to the fast moving valve said valve-operating plunger being located in a chamber, a conduit connecting said valve-operating plunger chamber to the delivery passageway, and a spring-pressed slow moving valve normally closing communication between said conduit and the delivery passageway and arranged to be moved by the pressure in said delivery passageway to open access from the delivery passageway to the valve-operating plunger chamber so as to open said circuit but to close access from the valve operating plunger chamber to said circuit when the fast moving valve is opening, said valve operating plunger having a balanced portion normally in communication with the pressure fluid, said spring-pressed sides of the fast and slow moving valves being connected to said circuit.

5. A fast moving cylindrical plunger valve for alternately closing and opening by the cylindrical valve surface a pressure fluid circuit, a delivery passageway for pressure fluid, a check valve between a discharge-receiving chamber in said circuit and said delivery passageway, a spring-pressed imperforate valve-operating plunger attached to the fast moving valve said valve-operating plunger being located in a chamber, a conduit connecting said valve-operating plunger chamber to the delivery passageway, and a slow moving valve normally closing communication between said conduit and the delivery passageway and arranged to be moved by the pressure in said delivery passageway to open access from the delivery passageway to the valve-operating plunger chamber so as to open said circuit but to close access from the valve operating plunger chamber to said circuit when the fast moving valve is opening, said valve operating plunger having a balanced portion normally in communication with the pressure fluid, said fast and slow moving valves having reduced intermediate portions connected to said circuit.

6. A spring-pressed fast moving cylindrical plunger valve for alternately closing and opening by the cylindrical valve surface a pressure fluid circuit, a delivery passageway for pressure fluid, a check valve between a discharge-receiving chamber in said circuit and said delivery passageway, a spring-pressed imperforate valve-operating plunger attached to the fast moving valve said valve-operating plunger being located in a chamber, a conduit connecting said valve-operating plunger chamber to the delivery passageway, and a spring-pressed slow moving valve normally closing communication between said conduit and the delivery passageway and arranged to be moved by the pressure in said delivery passageway to open access from the delivery passageway to the valve-operating plunger chamber so as to open said circuit but to close access from the valve operating plunger chamber to said circuit when the fast moving valve is opening, said valve-operating plunger having a balanced portion normally in communication with the pressure fluid, said fast and slow moving valves having reduced intermediate portions connected to said circuit.

7. A fast moving cylindrical plunger valve for alternately closing and opening by the cylindrical valve surface a pressure fluid circuit, a delivery passageway for pressure fluid, a check valve between a discharge-receiving chamber in said circuit and said delivery passageway, a spring-pressed imperforate valve-operating plunger attached to the fast moving valve said valve-operating plunger being located in a chamber, a conduit connecting said valve-operating plunger chamber to the delivery passageway, and a slow moving valve normally closing communication between said conduit and the delivery passageway and arranged to be moved by the pressure in said delivery passageway to open access from the delivery passageway to the valve-operating plunger chamber so as to open said circuit but to close access from the valve operating plunger chamber to said circuit when the fast moving valve is opening, said valve-operating plunger having a balanced portion normally in communication with the pressure fluid, said fast and slow moving valves being connected to said circuit and having reduced intermediate portions also connected to said circuit.

8. A spring-pressed fast moving cylindrical plunger valve for alternately closing and opening by the cylindrical valve surface a pressure fluid circuit, a delivery passageway for pressure fluid, a check valve between a discharge-receiving chamber in said circuit and said delivery passageway, a spring-pressed imperforate valve-operating plunger attached to the fast moving valve said valve-operating plunger being located in a chamber, a conduit connecting said valve-operating plunger chamber to the delivery passage, and a spring-pressed slow moving valve normally closing communication between said circuit and the delivery passageway and arranged to be moved by the pressure in said delivery passageway to open access from the delivery passageway to the valve-operating plunger chamber so as to open said circuit but to close access from the valve operating plunger chamber to said circuit when the fast moving valve is opening, said valve-operating plunger having a balanced portion normally in communication with the pressure fluid, said spring-pressed sides of the fast and slow moving valves being connected to said circuit and said fast and slow moving valves having reduced intermediate portions also connected to said circuit.

9. A fast moving cylindrical plunger valve for alternately closing and opening by the cylindrical valve surface a pressure fluid circuit, a delivery passageway for pressure fluid, a check valve between a discharge-receiving chamber in said circuit and said delivery passageway, a spring-pressed imperforate valve-operating plunger attached to the fast moving valve said valve-operating plunger being located in a chamber, a conduit connecting said valve-operating plunger chamber to the delivery passageway, a slow moving valve normally closing communication between said conduit and the delivery passageway and arranged to be moved by the pressure in said delivery passageway to open access from the delivery passageway to the valve-operating plunger chamber so as to open said circuit but to close access from the valve operating plunger chamber to said circuit when the fast moving valve is opening, said fast and slow moving valves having reduced intermediate portion connected to said circuit, and a part of said circuit being located between the fast and slow moving valves to connect their spring-pressed ends and reduced portions together.

10. A spring-pressed fast moving cylindrical plunger valve for alternately closing and opening by the cylindrical valve surface a pressure fluid circuit, a delivery passageway for pressure fluid, a check valve between a discharge-receiving chamber in said circuit and said delivery passageway, a spring-pressed valve-operating plunger attached to the fast moving valve said valve-operating plunger being located in a chamber, a conduit connecting said valve-operating plunger chamber to the delivery passageway, a spring-pressed slow moving valve normally closing communication between said conduit and the delivery passageway and arranged to be moved by the pressure in said delivery passageway to open access from the delivery passageway to the valve-operating plunger chamber so as to open said circuit but to close access from the valve operating plunger chamber to said circuit when the fast moving valve is opening, said fast and slow moving valves having reduced intermediate portions connected to said circuit, and a part of said circuit being located between the fast and slow moving valves to connect their spring-pressed ends and reduced portions together.

11. A fast moving cylindrical plunger valve for alternately closing and opening by the cylindrical valve surface a pressure fluid circuit, a delivery passageway for pressure fluid, a check valve between a discharge-receiving chamber in said circuit and said delivery passageway, a spring-pressed imperforate valve-operating plunger attached to the fast moving valve said valve-operating plunger being located in a chamber, a conduit connecting said valve-operating plunger chamber to the delivery passageway, a slow moving valve normally closing communication between said conduit and the delivery passageway and arranged to be moved by the pressure in said delivery passageway to open access from the delivery passageway to the valve-operating plunger chamber so as to open said circuit but to close access from the valve operating plunger chamber to said circuit when the fast moving valve is opening, said fast and slow moving valves being connected to said circuit and having reduced intermediate portions also connected to said circuit, and a part of said circuit being located between the fast and slow moving valves to connect their spring-pressed ends and reduced portions together.

12. A spring-pressed fast moving cylindrical plunger valve for alternately closing and opening by the cylindrical valve surface a pressure fluid circuit, a delivery passageway for pressure fluid, a check valve between a discharge-receiving chamber in said circuit and said delivery passageway, a spring-pressed imperforate valve-operating plunger attached to the fast moving valve said valve-operating plunger being located in a chamber, a conduit connecting said valve-operating plunger chamber to the delivery passageway, a spring-pressed slow moving valve normally closing communication between said conduit and the delivery passageway and arranged to be moved by the pressure in said delivery passageway to open access from the delivery passageway to the valve-operating plunger chamber so as to open said circuit but to close access from the valve operating plunger to said circuit when the fast moving valve is opening, said spring-pressed sides of the fast and slow moving valves being connected to said circuit and said fast and slow moving valves having reduced intermediate portions also connected to said circuit, and a part of said circuit being located between the fast and slow moving valve to connect their spring-pressed ends and reduced portions together.

EDWIN G. STAUDE.

REFERENCES CITED

The following references are of record in the file of this patent:

UNITED STATES PATENTS

| Number | Name | Date |
|---|---|---|
| 703,220 | White | June 24, 1902 |
| 976,917 | Richards | Nov. 29, 1910 |
| 1,532,326 | Lent | Apr. 7, 1925 |
| 2,241,665 | Herman | May 13, 1941 |
| 2,264,375 | Hill | Dec. 2, 1941 |
| 2,279,176 | Pardee | Apr. 7, 1942 |
| 2,316,445 | Marshall | Apr. 13, 1943 |
| 2,347,238 | Bennett | Apr. 25, 1944 |
| 2,375,411 | Grant | May 8, 1945 |
| 2,420,394 | Gilman | May 13, 1947 |
| 2,437,480 | Pugh | Mar. 9, 1948 |